United States Patent Office 3,243,446
Patented Mar. 29, 1966

3,243,446
PROCESS OF TREATING SPENT ROLLING OIL SOLUTION WITH SPENT PICKLING SOLUTION
Benjamin W. Funk, Berks County, Pa.
(753 Wyomissing Blvd., Wyomissing, Pa.)
No Drawing. Filed Aug. 2, 1962, Ser. No. 214,210
5 Claims. (Cl. 260—412.5)

This invention relates broadly to a process for treating a waste material with another waste material to accomplish the removal of contaminants from both waste materials. More particularly, this invention relates to a process for reclaiming for reuse rolling oil such as palm oil and the like from a rolling oil sludge by treating the sludge with spent or waste pickling solution.

A water soluble oil or a mixture of oils is employed in the steel industry as an aid in rolling steel, particularly in the cold rolling of steel strips. The cold rolling process generates considerable heat and not only raises the temperature of the product but also that of the rolls. The heat generated must be dissipated by a system of flood lubrication in which a water soluble oil, as for example, palm oil, is directed in streams or jets against the roll bodies and the surface of the steel and thereby cool and lubricate the product rolled and the rolls. The oil is usually in the form of an aqueous emulsion in various concentrations from 5% to 50% depending upon the rolling conditions and whether the oil emulsion is to be recirculated or only used once and discarded. In any event, the aqueous emulsion is used until spent or contaminated beyond usefulness at which time it is discarded as waste sludge having substantially unchanged reusable oil in emulsion form together with contaminants such as dirt, grease, ferrous metal particles and ferrous metal soaps and derivatives.

As is well known to the art, pickling is the process of chemically removing oxides and scale from the surface of a metal by the action of water solutions of inorganic acids. The reaction occurring when the steel product is immersed in dilute inorganic acid such as sulphuric acid involves the solution of metal as salt of the acid and the evolution of hydrogen. The end product of reaction being ferrous sulphate and hydrogen. The acid concentration in solution varies over a relatively wide range in the industry depending upon the amount of pickling required to prepare the surface of the product for the next operation and other conditions such as temperature of the solution, agitation, time of immersion and the presence of inhibitors. The ferrous sulphate acts as a retarding or inhibiting agent in the pickling action. The salt accumulation is allowed to about 2 to 8% by weight and the bath is worked until the free acid content is about 2 to 8% by volume at which time the pickling solution is considered to be spent and is discarded as waste material. The balance of the solution is water, dirt and other sediments.

The rolling oil sludge and the waste pickling solution are discarded as waste and as such constitute a pollution problem in the disposal system of the plant.

An object of my invention is the process for treating rolling oil sludge with waste pickling solution to reclaim the usable oil.

Another object of my invention is the process for treating an oil sludge with waste pickling solution to precipitate sufficient contaminants in both sludge and pickling solution to appreciably upgrade these waste materials and reduce the pollution problem in the plant disposal system.

Still another object of my invention is the process for treating the oil sludge with a waste material which accomplishes the purifying reaction more rapidly, more completely and more economically than the prior practice.

Other objects and advantages of my invention will become apparent from a careful study of the following detailed description of my process.

An example of the general practice of the present process includes the collection of the coolant water and oil mixture drained from the roll mill stands after passing over and about the rolled strip and the rolls of the mill into pits or settling tanks. The supernatant sludge is skimmed from the top of the mixture and is caused to flow to a reactor tank. The water solution is discharged from the pit into the sewage system of the plant or it may be reused. The spent pickling solution is conveyed from the pickling tank to a reservoir tank which is provided with means to discharge the spent pickling solution in the form of a spray on the sludge in the reactor tank to insure a complete and intimate mixture of the oil and pickling solution. Means are provided on the reactor tank to automatically decant the aqueous solution to waste as more spent pickling solution is sprayed on the oil layer to complete the reaction. The fluid mass is then maintained preferably at an elevated temperature until insoluble precipitates are formed and the oil and aqueous solution separate into layers. Following the pickling solution treatment, the oil is washed with hot water until completely free of mineral acidity and occluded precipitate. I have found that the ferrous sulphate of the spent pickling solution serves as a flocculating agent for the contaminants in the sludge and as an electrolyte it increases the specific gravity of the aqueous layer and thus facilitates the separation of the reusable oil from the contaminants and breaks the emulsion so that the oil and the aqueous solution separate into layers. The free acid content of the spent pickling solution is sufficient to react with and dissolve the metallic contaminants.

The above example of my process contemplates the use of an open tank contactor, however other type contactors may be used such as counter-current columns, centrifugal contactors and heat exchanger type contactors. The above process may be adapted to the equipment used.

Though the separated oil thus recovered for reuse many require further processing to improve the physical and chemical properties of the oil, such as bleaching for improved color, or steamed stripped to top off solvent or petroleum lubricant contaminants which may have become mixed with the rolling oil, or the oil may be partially distilled to eliminate excess fatty acids or may be reacted with additional glycerine to esterify the free fatty acids, these and other refining processes are standard practice and are well known to those skilled in the art.

In the following examples, I shall illustrate the process of my invention and compare the resulting products.

EXAMPLE 1

2,000 gallons (15,000 lbs.) of supernatant sludge containing palm oil was skimmed from the top of the first compartment in the rolling oil solution tank of a recirculating system servicing a 4 stand cold strip mill, and charged into a lead lined, coil heated cone bottom reactor vessel and maintained in a temperature range of 170°–180° F. during the reaction period. The reactor tank is provided with a hydrostatic overflow to discharge the spent pickling solution from the bottom of the tank while maintaining therein 5,000 gallons of the liquid mass. Spent pickling on the sludge while hot (about 180° F.) at the rate of 20 gallons per minute for an 8 hour period for a total of about 10,000 gallons. The liquid mass was allowed to settle for a period of about 8 hous after which period the aqueous layer was drained off and the separated palm oil layer was washed with about 5,000 gallons of fresh water at a temperature of 170° F. to a pH value of 6.8. The average oil yield for 25 of the above experiments was 1,000 gallons (7,300 lbs.).

EXAMPLE 2

In this experiment, 4,000 gallons (30,000 lbs.) of the aqueous layer below the top sludge in the solution tank of Example 1 was charged into the reactor tank and maintained in a temperature range of 170°–180° F. during the reaction period. Spent pickling solution at a temperature of about 180° F. was sprayed on the aqueous liquid at the rate of 20 gallons per minute for a 10 hour period for a total of about 12,000 gallons. The liquid mass was allowed to settle for a period of 8 hours after which period the aqueous layer was drained and the separated palm oil layer was washed with about 5,000 gallons of fresh water at a temperature of 170° F. to a pH value of 6.8. The average oil yield was 300 gallons (2,200 lbs.).

EXAMPLE 3

In the third experiment, 3,000 gallons (22,000 lbs.) of supernatant sludge was skimmed from the top of the coolant water collecting pit or tank of a direct application or a once through oil system servicing a 5 stand cold strip mill and charged into the reactor tank and maintained in a temperature range of 190°–210° F. during the reaction period. Spent pickling solution at a temperature of about 180° F. was sprayed on the sludge at the rate of 30 gallons per minute for 16 hours for a total of about 30,000 gallons. The liquid mas was allowed to settle for a period of 6 hours after which period the aqueous layer was drained and the separated oil layer was washed with 4,000 gallons of fresh water at a temperature of 180° F. to a pH value of 6.9. The average oil yield was 1,800 gallons (13,200 lbs.).

Comparison of Examples 1–3

The average specifications of the recovered oil by the process of the above examples are tabulated below.

| Example | 1 | 2 | 3 |
| --- | --- | --- | --- |
| Percent oil yield from sludge | 40–50 | 4–12 | 45–60 |
| Moisture content, percent | .2–.4 | .2–.5 | .1–.3 |
| Ash content, percent | .01–.02 | .01–.04 | .01–.02 |
| FFA, percent | 12–18.3 | 49–78 | 11–16.1 |
| SN | 179–185 | 181–188 | 180–190 |

In Example 2, the treated solution was reused solution after it had become too contaminated for further reuse. This starting solution contained only about 6–12% rolling oil.

Comparative test 1

To test the efficacy of my invention by comparison with the process of the prior practice, repeated experiments were performed by testing samples of sludges skimmed from the solution settling tanks having the following average composition.

| | |
| --- | --- |
| Water | 25% to 80% in skimmed sludges; 80% to 98% in solutions. |
| Metallic iron and iron salts | .5% to 12%. |
| Total oleaginous compounds | .5% to 70%. |
| Iron combined as soaps | .05% to 5%. |
| Color | Tan to gray-black. |

One group of these samples were treated with dilute sulphuric acid in accordance with the principle of the prior practice, that is, the sulphuric acid was fresh or not used, and another group of samples were treated with spent pickling solution in accordance with the teaching of the present invention. The following are comparative results of these tests:

| | | |
| --- | --- | --- |
| Treatment | 200 ml. rolling oil sludge sample treated with 400 ml. 6% fresh sulphuric acid. | 200 ml. rolling oil sludge sample treated with 400 ml. of spent pickling solution having 5% sulphuric acid and 4% ferrous sulphate. |
| Temperature, 150°–190° F. | No layer to slight layer of oil. | Slight layering of oil and aqueous layers. |
| Boil ½ hour | Separation into 3 layers—Oil, Emulsion, Acid water. | Separation into 2 layers—Oil, Sulphate water. |
| Yield | 80 ml. oil, 80 ml. emulsion, 440 ml. sulphate water. | 110 ml. oil, 490 ml. sulphate water. |

Comparative test 2

A second comparative test was made to determine the action of spent pickling solution on oil sludges containing emulsifiers which are added to the rolling oil solutions to produce a more stable emulsion when the rolling oil solution is sprayed on the rolled strip. These oils are primarily used to lubricate the rolled strip which is not washed after the cold rolling process. A batch of samples of these emulsifier bearing oil sludge solutions was treated with a dilute solution of fresh sulphuric acid and another batch of like samples was treated with spent pickling solution in accordance with the principles of my process. The following are comparative results of these tests.

| | | |
| --- | --- | --- |
| Treatment | 200 ml. waste rolling oil solution having emulsifiers treated with 600 ml. of 6% fresh sulphuric acid. | 200 ml. waste rolling oil solution having emulsifiers treated with 600 ml. spent pickling solution having 6% sulphuric acid and 4.5% ferrous sulphate. |
| Temperature of reaction 90°–190° F. | No separation. | Partial separation—400 ml. emulsion, 400 ml. clear sulphate water. |
| Boiled at 215° F. for 1 hour | Partial separation—750 ml. emulsion, 50 ml. clear acid water. | Complete separation—Reusable rolling oil 22 ml., 778 ml. spent sulphate layer. |
| Boiled at 215° F. for 2 hours | Partial separation—600 ml. emulsion, 200 clear acid. | |

In every test, I found that the reaction of the sludge solution with the spent pickling solution was more rapid and complete than when treated with the dilute solution of fresh sulphuric acid as is the practice of the conventional process. My conclusion is that this phenomenon was due to the presence of the ferrous sulphate in the spent pickling solution which when applied in accordance with my process reacted in the mixture as above described to obtain the above desirable results. These results are obtainable when the reaction takes place at ambient temperature (±80° F.) over a prolonged period of time, and at elevated temperature in autoclave (±300° F.).

My invention is applicable to different grades of spent rolling oil sludges and is equally effective to recover the oil from spent rolling oil which has been subjected to severe use as well as spent rolling oil not so worked. However, the recovered oils may require varying degrees of refining processing in order to obtain uniform qualities for reuse.

Although I have described my invention with the particularity required for one skilled in the art to practice it, it is understood that this disclosure has been made only by way of example and that I do not wish to be limited to the details of the examples since various other forms of apparatus may be used to carry out the steps of my novel process and various modifications in the process steps may be made such as changes in temperature, rate of flow and the like without in any way departing from the spirit and scope of the invention as claimed.

I claim:

1. A process for treating spent rolling oil solution containing a fatty oil emulsion, water and rolling mill contaminants, and spent pickling solution containing sulphuric acid, comprising the steps of;
    adding a greater proportion of said pickling solution to said rolling oil solution; and
    maintaining said pickling and rolling oil solution mixture at a temperature between about 90° F. and 215° F. until insoluble precipitates are formed and an oil and an aqueous layering occurs.

2. A process for treating spent rolling oil solution containing a fatty oil emulsion, water and rolling mill contaminants, and spent pickling solution containing sulphuric acid, water, and a solution of ferrous metal as salt of the acid, comprising the steps of;
    adding a greater proportion of said pickling solution to said rolling oil solution;
    maintaining said pickling and rolling oil solution mixture at a temperature between about 90° F. and 215° F. until insoluble precipitates are formed and an oil and an aqueous layering occurs;
    removing the aqueous layer; and
    washing the oil with water until neutral.

3. A process for treating spent rolling oil solution containing a fatty oil emulsion, water and rolling mill contaminants, and spent pickling solution containing sulphuric acid, water and a solution of ferrous metal as salt of the acid, comprising the steps of;
    adding a greater proportion of said pickling solution to said rolling oil solution;
    maintaining the spent pickling and rolling oil solution mixture at a temperature between about 170° F. and 210° F. until the emulsion is broken and layering occurs;
    separating the layer of oil from the aqueous layer; and
    washing said oil with hot water at a temperature between about 170° F. and 180° F.

4. A process for treating spent rolling oil solution containing an emulsion of palm oil and water and contaminants, comprising the steps of;
    intimately contacting a greater proportion of spent pickling solution containing 2–8% free sulphuric acid in a water solution and 2–8% ferrous sulphate in said solution with said rolling oil solution;
    maintaining said acid and rolling oil solution mixture at a temperature between 90° F. and 215° F. until insoluble precipitates are formed and an oil and aqueous layering occurs; and
    washing the oil layer with water until neutral.

5. A process for treating spent rolling oil solution containing a fatty oil emulsion, water and rolling mill contaminants, comprising the steps of;
    adding to said spent rolling oil solution spent pickling solution containing 2–8% free sulphuric acid in a water solution and 2–8% ferrous sulphate in said solution;
    maintaining said spent rolling oil solution and spent pickling solution mixture at a temperature between approximately 215° F. and 300° F. under autogenic pressure until insoluble precipitates are formed and an oil and aqueous layer occurs; and
    washing the oil layer with water until neutral.

References Cited by the Examiner
UNITED STATES PATENTS

| | | | |
|---|---|---|---|
| 1,763,430 | 6/1930 | Holden et al. | 200—412.5 |
| 2,587,954 | 3/1952 | Babayan | 260—412.5 |
| 2,806,868 | 9/1957 | Kovacs | 260—412.5 |

FOREIGN PATENTS

| | | |
|---|---|---|
| 722,832 | 4/1952 | Great Britain. |

CHARLES B. PARKER, *Primary Examiner.*

DANIEL D. HORWITZ, *Examiner.*

A. H. SUTTO, *Assistant Examiner.*